United States Patent [19]

Robinson et al.

[11] 3,727,150

[45] Apr. 10, 1973

[54] YTTERBIUM GLASS LASER WITH AN OUTPUT IN THE 1,024 NANOMETERS RANGE

[75] Inventors: Charles C. Robinson; Robert R. Shaw, both of Sturbridge, Mass.; Joseph T. Fournier, Storrs, Conn.

[73] Assignee: American Optical Corporation, Southbridge, Mass.

[22] Filed: Oct. 22, 1971

[21] Appl. No.: 191,936

[52] U.S. Cl. ............................. 331/94.5, 252/301.4
[51] Int. Cl. .............................................. H01s 3/00
[58] Field of Search ................. 331/94.5; 252/301.4

[56] References Cited

UNITED STATES PATENTS 3,640,890  2/1972  Lee, Jr. et al. ..................... 252/301.4

FOREIGN PATENTS OR APPLICATIONS 1,454,681  10/1966  France ............................... 331/94.5
1,454,682  10/1966  France ............................... 331/94.5

OTHER PUBLICATIONS

Karapetyan et al., Inorganic Materials, Vol. 3, No. 2, Feb. 1967, pp. 190–230.
Galant et al., Soviet J. of Optical Technology, 36, (6), Nov. -Dec. 1969, pp. 770–788.
Young, Microwaves–Laser Technology Sec. July 1968, pp. 69–78.

*Primary Examiner*—William L. Sikes
*Assistant Examiner*—R. J. Webster
*Attorney*—Lane, Aitken, Dunner & Ziems

[57] ABSTRACT

A laser device containing an optically resonant laser cavity which is reflective for a light with an optical center between the 1,020–1,032 nanometer range and an ytterbium doped glass host, the composition of which is selected so that the host is capable of exhibiting fluorescence peaked between the 1,020–1,032 nanometer range of the spectrum. The glass composition is a silicate glass which includes a monovalent alkali metal oxide selected from a member of the group consisting of rubidium, cesium, potassium and mixtures thereof. The foregoing monovalent alkali metal oxides have been found to increase the fluorescent peaks of ytterbium doped glasses between 1,020–1,032 nanometers, making laser action at this wavelength possible.

10 Claims, 8 Drawing Figures

INVENTORS
CHARLES C. ROBINSON
ROBERT R. SHAW &
JOSEPH T. FOURNIER

BY *Sanes, Aitken, Dunner & Ziems*

ATTORNEYS

YTTERBIUM GLASS LASER WITH AN OUTPUT IN THE 1,024 NANOMETERS RANGE

BACKGROUND OF THE INVENTION

Since the first reported discovery of laser action from a glass host (see Snitzer, *Physical Review Letters*, Vol. 7, 1961, No. 12, pp. 444–446), much research and effort has been expended in order to develop glass lasers which emit laser light at different wavelengths.

Glass has various characteristics which can make it an ideal laser host material. It can be made in large pieces of diffraction-limited optical quality, e.g., with an index of refraction variation of less than one part per million across a 2.5 cm diameter. In addition, glass lasers have been made in a variety of shapes and sizes from fibers a few microns wide supporting only a single dielectric waveguide mode, to rods 2 meters long and 7.5 cm in diameter. Furthermore, pieces of glass with quite different optical properties can be fused to solve certain system design problems.

Glass compositions can be tailored to give an index of refraction in the range of 1.5 to 2.0. Also, thermally stable laser cavities can be achieved by adjusting glass constituents to create an athermal laser glass.

There are two important differences between glass and crystal lasers. First, the thermal conductivity of glass is considerably lower than that of most crystal hosts. The second important difference between glass and crystal lasers is the inherently broader absorption and emission lines of ions in glass. These broader lines imply greater pump-light absorption and greater energy storage.

Many laser wavelengths have been generated from rare earth doped glass hosts. For example, trivalent neodymium has been lased at 1,060 nanometers, 1,370 nanometers and 920 nanometers. Trivalent ytterbium has been made to lase at 1,060 nanometers and 1,015 nanometers. Many other rare earths have been made to lase at other wavelengths. These ions include, by way of example, erbium, holmium and thulium. Prior to the present discovery, however, no glass laser generator has produced laser action at wavelengths within the 1,020–1032 nanometer range.

The desirability of generating light at wavelengths within the 1,020–1032 nanometer range of the spectrum is notable with systems utilizing detectors since there are detectors available which are more sensitive at this wavelength than the more common longer wavelengths.

SUMMARY OF THE INVENTION

In accordance with the present invention, a glass ytterbium doped laser device is provided which is capable of laser emission in the vicinity of 1,024 nanometers, i.e., within the 1,020–1,032 nanometer range. In order to generate laser light at the foregoing waveband, it is necessary for the trivalent ytterbium to show increased fluorescent emission in the vicinity of 1,024 nanometers. It has been discovered that the required increased fluorescence can be made possible by employing heavy alkali ions along with the ytterbium oxide in a silicate glass.

Accordingly, it is an object of the present invention to provide a laser device which will generate laser energy at a heretofore unknown laser wavelength.

It is a further object of the invention to provide a laser device which is capable of generating laser light in a waveband having an optical center peaked between 1,020–1032 nanometers.

Yet another object of the invention is to provide a means for generating a new laser wavelength from an ytterbium doped laser.

It is a further object of the invention to provide a glass laserable material having new and useful fluorescent characteristics.

Another object of the invention is to provide a fluorescent material which has a relatively intense fluorescent emission peak within the 1,020–1,032 nanometer range of the spectrum.

DESCRIPTION OF THE PREFERRED EMBODIMENTS

In accordance with the present invention, a laser device is provided which is capable of generating laser light with an optical center peaked between 1,020–1,032 nanometers. The device is comprised of an ytterbium doped glass laser host containing heavy monovalent alkali ions. The host is positioned in an optically regenerative laser cavity which has a high Q factor in the 1,024 nanometers vicinity and a low Q factor at approximately 1,060 nanometers. As is well known in the laser art, the device must include a pump source for creating the required population inversion in the laser action ions which in the laser device of the present invention are ytterbium ions. The pump source can be any high energy light source which emits radiation in wavebands at which the laser ions absorb energy. An xenon flash tube is commonly employed with ytterbium doped lasers and can be utilized in the device of the present invention.

Figure 1:
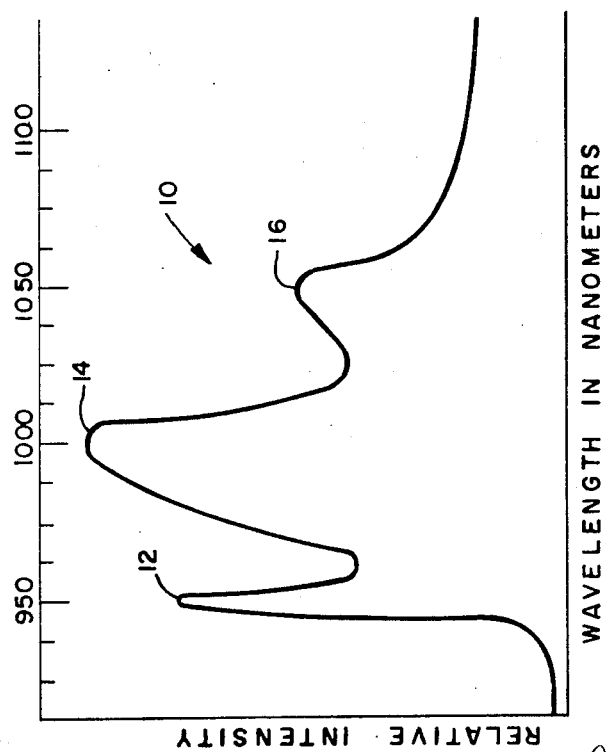
FIG. 1 is a schematic curve showing various fluorescent emission peaks of a $Yb^{3+}$ doped glass, the intensity of which can be varied by control of the glass compositions.

At the outset, FIG. 1 is provided in order to show the fluorescent spectra of the ytterbium ion. It should be understood that curve 10 of FIG. 1 does not necessarily represent the emission spectra of any particular glass, but is provided for illustrative purposes.

As is shown in FIG. 1, with 8 wt. % $Yb_2O_3$ in a silicate base glass the ytterbium ion has at least three peaks from which laser action can be generated. These peaks are peak 12 having an optical center at 981.5 nanometers, peak 14 having an optical center at approximately 1,024 nanometers and peak 16 having an optical center at 1,060 nanometers.

It is to be understood that various ytterbium doped silicate glasses may have more fluorescent peaks than are shown in FIG. 1 of the drawing. In this regard, only three peaks are shown for ease of illustrating the fluorescent properties desired in glasses used in the device of the present invention.

In accordance with the present invention, the composition of the laser host material is controlled in such a manner that there is a peak 14 at approximately 1,024 nanometers. For convenience, the peak 14 is referred to as being centered at 1,024 nanometers. Some shifting in the peak center is possible, however, and the peak may in fact be located anywhere between the 1,020 and 1,032 nanometer region of the spectrum.

It has been found that the emission of the ytterbium in the vicinity of 1,024 nanometers can be increased relative to the fluorescence of the other peaks by employing heavy alkali ions in a silicate glass.

To demonstrate the foregoing proposition, a series of binary alkali silicate glasses containing a 100 g base of 33 mol % $R_2O$ and 67 mol % $SiO_2$ were prepared. As used throughout this specification, R represents a monovalent alkali metal ion. To the foregoing base glass, 2 wt. % $Nd_2O_3$ and 8 wt. % $Yb_2O_3$ were added. Using the foregoing composition, each example in the series of glasses prepared contained a different $R_2O$. For each example, fluorescent emission from the ytterbium ion was measured. The results of these measurements appear in FIGS. 2–6.

Figure 2:
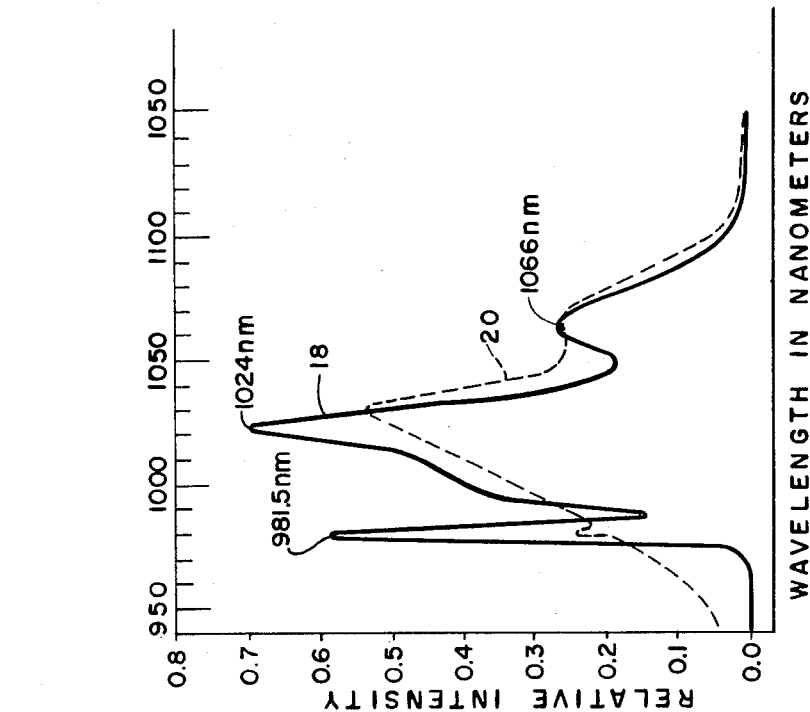
FIG. 2 is an emission curve showing fluorescent emission peaks of an ytterbium doped cesium-silicate glass.

FIG. 2 is an emission curve showing the florescent emission peaks of an ytterbium doped cesium silicate glass. The glass from which the curve was prepared had the composition given in Example 1 below:

EXAMPLE 1

| Constituent | Amount in Grams in Finished Glass |
|---|---|
| 33.3 mol % $Cs_2O$ | 100.0 |
| 66.7 mol % $SiO_2$ | 100.0 |
| $Nd_2O_3$ | 2.0 |
| $Yb_2O_3$ | 8.0 |

In FIG. 2, curve 18 represents the emission spectra from the ytterbium ion at 10° K and curve 20 represents the emission spectra from the ytterbium ion at room temperature (20° C). As is shown in FIG. 2, an ytterbium doped cesium silicate glass has an emission peak at approximately 1,024 nanometers which is sufficiently intense over a wide temperature range so that laser action at that wavelength is possible.

Figure 3:
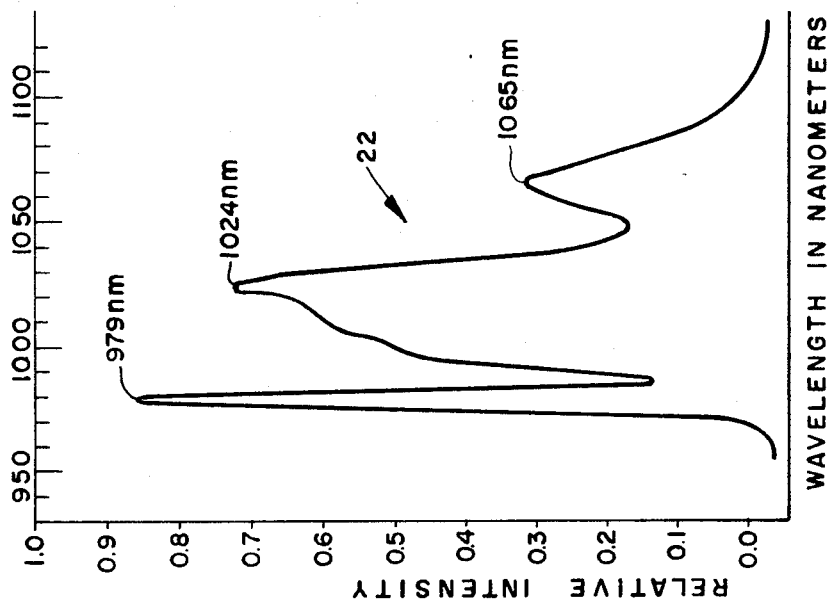
FIG. 3 is an emission curve showing fluorescent emission peaks of an ytterbium doped rubidium-silicate glass.

FIG. 3 is an emission curve showing the fluorescent emission peaks of an ytterbium doped rubidium silicate glass at 10° K. The glass from which the curve was prepared had the composition given in Example 2 below:

EXAMPLE 2

| Constituent | Amount in Grams in Finished Glass |
|---|---|
| 33.3 mol % $Rb_2O$ | 100.0 |
| 66.7 mol % $SiO_2$ | 100.0 |
| $Nd_2O_3$ | 2.0 |
| $Yb_2O_3$ | 8.0 |

As is shown by curve 22 of FIG. 3, the emission spectra at 1,024 nanometers from an ytterbium doped rubidium silicate glass is also sufficiently intense so that laser action at this wavelength is possible.

Figure 4:
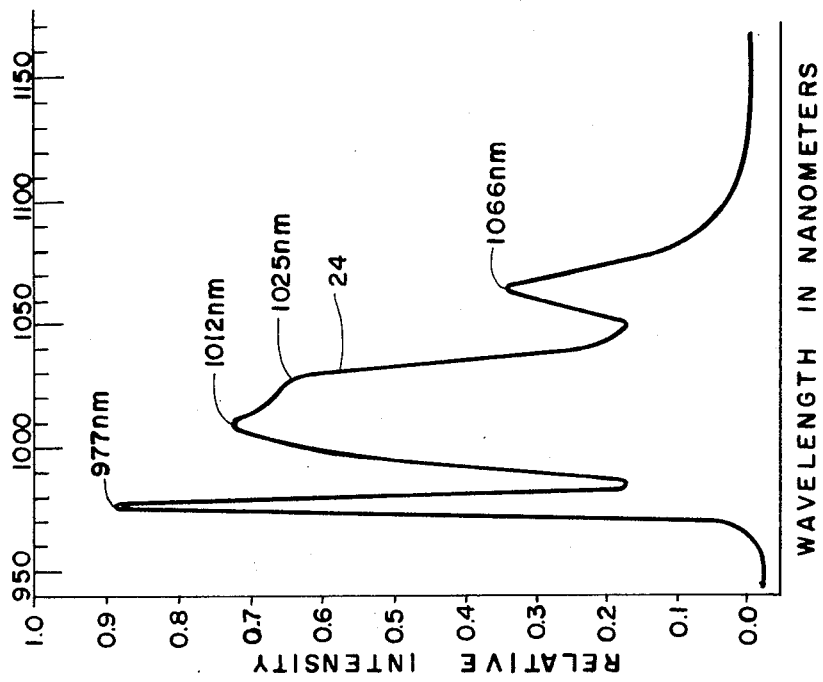
FIG. 4 is an emission curve showing fluorescent emission peaks of an ytterbium doped potassium-silicate glass.

FIG. 4 is an emission curve showing the fluorescent emission peaks of an ytterbium doped potassium silicate glass at 10° K. The glass from which curve 24 was prepared had the composition given in Example 3 below:

EXAMPLE 3

| Constituent | Amount in Grams in Finished Glass |
|---|---|
| 33.3 mol % $K_2O$ | 100.0 |
| 66.7 mol % $SiO_2$ | 100.0 |
| $Nd_2O_3$ | 2.0 |
| $Yb_2O_3$ | 8.0 |

This glass also shows sufficient emission at approximately 1,024 nanometers so that laser action in the vicinity of this wavelength is possible.

Figure 5:
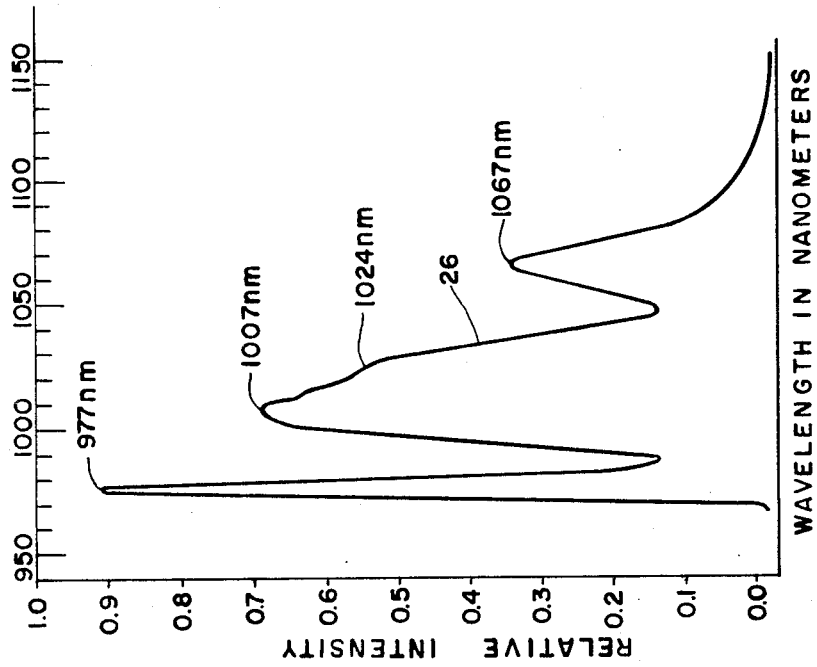
FIG. 5 is an emission curve showing fluorescent emission peaks of an ytterbium doped sodium-silicate glass.

FIG. 5 is an emission curve showing the fluorescent emission peaks of an ytterbium doped sodium silicate glass at 10° K. The glass from which the curve was prepared had the composition given in Example 4 below:

EXAMPLE 4

| Constituent | Amount in Grams in Finished Glass |
|---|---|
| 33.3 mol % $Na_2O$ | 100.0 |
| 66.7 mol % $SiO_2$ | 100.0 |
| $Nd_2O_3$ | 2.0 |
| $Yb_2O_3$ | 8.0 |

As is shown by curve 26 of FIG. 5, there is no pronounced peak in the vicinity of the 1,024 nanometers area, showing that the sodium silicate glasses would not be useful for generating laser action at this wavelength.

Figure 6:
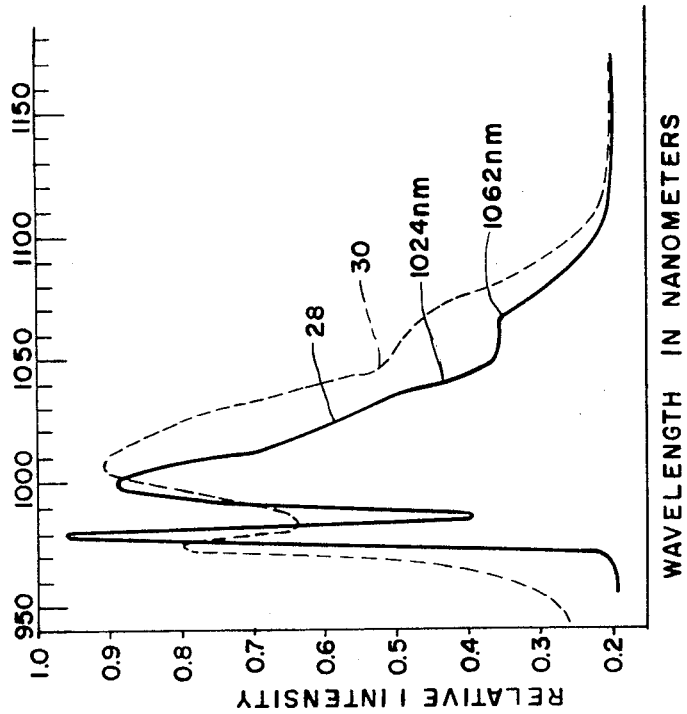
FIG. 6 is an emission curve showing fluorescent emission peaks of an ytterbium doped lithium-silicate glass.

FIG. 6 shows the fluorescent emission peaks of an ytterbium doped lithium silicate glass at 20° C and 10° K. The glass from which the curve was prepared had the composition given in Example 5 below:

EXAMPLE 5

| Constituent | Amount in Grams in Finished Glass |
|---|---|
| 33.3 mol % $Li_2O$ | 100.0 |
| 66.7 mol % $SiO_2$ | 100.0 |
| $Nd_2O_3$ | 2.0 |
| $Yb_2O_3$ | 8.0 |

The emission spectra for the lithium silicate glass at 10° K is shown by curve 28 and the room temperature (20° C) emission is shown by curve 30. These curves indicate that lithium silicate glasses would not be usable for generating laser light in the 1,024 nanometers vicinity of the spectrum.

A low temperature, viz. 10° K, was used in recording some of the spectra for the foregoing glasses because this temperature makes clear the transition intensities from the lowest lying metastable state to the levels of the ground manifold. In these glasses, the $Yb^{3+}$ fluorescence is occurring between the lowest Stark level of the $^2F_{5/2}$ manifold to the four Stark levels of the $^2F_{7/2}$ manifold.

The foregoing examples represent binary silicate glasses which, although operable in a laser device, are not of the highest optical quality. In connection with improving the optical quality of the foregoing glasses and to promote the glasses' stability, it is desirable to include divalent metal ions. In this regard, calcium, barium, magnesium, zinc and cadmium are often employed to stabilize the glass and to improve the optical quality thereof. The addition of these ions decreases the effect of the heavy alkali ion, but the decrease is not serious. Other ions commonly used in the glass making art may also be included in the silicate base to improve the optical quality and durability. In this regard, low amounts of alumina $Al_2O_3$, up to 5 wt. percent, and various fining agents, such as antimony and tin oxides, up to 2 wt. percent, will not seriously attenuate the desirable high intensity of the 1,024 nanometers emission.

Barium within the range of 0–10 wt. percent is desirable in maintaining the high intensity of the 1,024 nanometers emission. A range of 0–10 wt. percent is suitable for others of the heavier divalent ions useful in the glass composition. Good results are possible from a glass including approximately 5 wt. % BaO.

As has been pointed out above, for purposes of the present invention the most important constituent in the glass is the type of monovalent alkali oxide included. In accordance with the invention, it has been discovered that the intensity of the 1,024 nanometers emission is effected by the selection of the alkali ion. For the binary glasses in the foregoing examples, the increase in intensity is greatest for glasses containing $Cs_2O$. When other $R_2O$ replace $Cs_2O$, the intensity of the 1,024 nanometers emission decreases. In this regard, $Rb_2O$ shows less of a decrease than $K_2O$, which shows less decrease than $Na_2O$, which in turn shows less decrease than $Li_2O$. If a glass contains more than one alkali ion, the inclusion of one of the heavier ions will still enhance the 1,024 nanometers emission. The usable range of heavier monovalent alkali oxides in the glass is within the range of approximately 20–60 wt. percent. The usable range of constituents for a silicate glass are set forth in Table 1 below:

TABLE 1

| Constituent | Range in % by Weight |
|---|---|
| $SiO_2$ | 30–79 |
| $R_2O$ ($K_2O$, $Rb_2O$ and $Cs_2O$) | 20–60 |
| Divalent metal oxide | 0–15 |
| $Al_2O_3$ or $La_2O_3$ | 0–5 |
| $B_2O_3$ | 0–2 |
| Fining agent | 0–2 |
| $Nd_2O_3$ | 0.1–3 |
| $Yb_2O_3$ | 0.3–8 |

Optical quality ytterbium doped laser glasses containing a heavy monovalent alkali metal oxide within the range shown in Table 1 have been prepared and the fluorescent spectra of these glasses show peaks in the vicinity of 1,024 nanometers. Representative examples of such glasses are found below:

EXAMPLE 6

| Constituent | % by Weight |
|---|---|
| $SiO_2$ | 44.00 |
| BaO | 9.20 |
| $Rb_2O$ | 36.80 |
| $Yb_2O_3$ | 8.00 |
| $Nd_2O_3$ | 2.00 |

EXAMPLE 7

| Constituent | % by Weight |
|---|---|
| $SiO_2$ | 45.00 |
| $Cs_2O$ | 44.00 |
| BaO | 5.00 |
| $Al_2O_3$ | 1.00 |
| $Nd_2O_3$ | 1.00 |
| $Yb_2O_3$ | 4.00 |

EXAMPLE 8

| Constituent | % by Weight |
|---|---|
| $SiO_2$ | 40.00 |
| $Cs_2O$ | 49.00 |
| BaO | 5.00 |
| $Al_2O_3$ | 1.00 |
| $Nd_2O_3$ | 1.00 |
| $Yb_2O_3$ | 4.00 |

EXAMPLE 9

| Constituent | % by Weight |
|---|---|
| $SiO_2$ | 35.00 |
| $Cs_2O$ | 54.00 |
| BaO | 5.00 |
| $Al_2O_3$ | 1.00 |
| $Nd_2O_3$ | 1.00 |
| $Yb_2O_3$ | 4.00 |

EXAMPLE 10

| Constituent | % by Weight |
|---|---|
| $SiO_2$ | 28.00 |
| $Cs_2O$ | 59.00 |
| BaO | 5.00 |
| $Al_2O_3$ | 1.00 |
| $Nd_2O_3$ | 1.00 |
| $Yb_2O_3$ | 6.00 |

The foregoing glasses are preferably formed in the following manner. The alkali earths and alkaline earth metals are added to the batch as nitrates or carbonates and all other constituents of the finished glass (silica, neodymium, zinc, boron, antimony) are added directly as oxides. The constituents are added in the known stoichiometric amounts to yield a glass having a final composition as set forth in Table 1 above. The glass making raw materials must be of high purity and, in particular, must be free of contamination from iron or other elements which would cause light absorption at the desired laser emission wavelength if they were present in the finished glass. The finished glass, for example, should not contain more than 5 parts per million of iron as $Fe_2O_3$. The glass may be prepared by fusing the raw materials in a ceramic crucible heated in a "Globar" electric furnace. No special atmosphere is necessary in the furnace. The raw materials are mixed intimately and as completely as possible in a mixing device that does not introduce any contamination. The mixed batch is loaded into a high purity ceramic crucible which will not contaminate the melt with undesirable impurities. The crucible should be at a temperature of approximately 2,700° F when the raw material is charged, the loading operation taking approximately 2 hours since the level in the crucible drops as the batch materials fuse together to form the glass and thus require the addition of more batch. When the charging of the batch is completed, the temperature of the melt is raised to approximately 2,800° F and is held at this temperature for 1 hour to free the melt of striae. The temperature of the glass is then lowered to approximately 2,700° F where it is maintained for a period of about 1 hour before casting. The temperature value last recited is suitable for a melt of 1 lb. but it is to be understood that the preferred temperature at casting is a function of the size of the cast with larger casts requiring lower temperatures for control of the glass. The glass may be cast in a cast iron mold, and is transferred to an annealing oven just as soon as it has cooled enough to maintain its shape. The glass is annealed at a temperature of 1,100° F for one hour and is then cooled down slowly overnight to room temperature.

Figure 7:
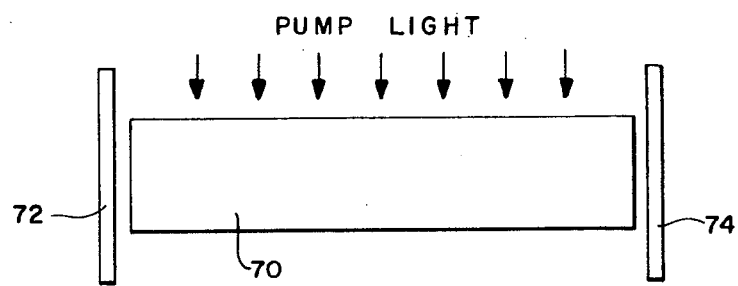
FIG. 7 is a diagrammatic illustration of a laser device of the present invention.

As is well known in the art, in order to produce laser action from a laser generator, the host must be positioned in an optically regenerative laser cavity. Such a cavity is shown in FIG. 7. The host glass having a composition within the range shown in Table 1 is fabricated using known techniques. The rod 70 is positioned in an optically regenerative laser cavity formed by reflectors 72 and 74.

In order to promote laser action from the heavy alkali silicate glasses, it is necessary to have a laser cavity with a high Q at 1,024 nanometers. Since ytterbium ions do not absorb all of the energy emitted by conventional pump sources, such as xenon tubes, neodymium oxide is included in the host glass to absorb light from the pump source which would be otherwise wasted. The energy absorbed by the neodymium ions is transferred to the ytterbium ions. Because of the inclusion of the neodymium ions, the cavity must have a low Q at 1,060 nanometers in order to prevent laser action at this wavelength. A high Q at 1,024 nanometers and a low Q at 1,060 nanometers is accomplished with dichroic mirrors or reflectors. It is to be understood that suitable reflectors are available and that the reflectors per se form no part of the present invention. For example, dichroic reflectors are available which transmit approximately 85 percent of the light at 1,060 nanometers while reflecting approximately 90.0 percent of the light at the 1,024 nanometers region.

Figure 8:
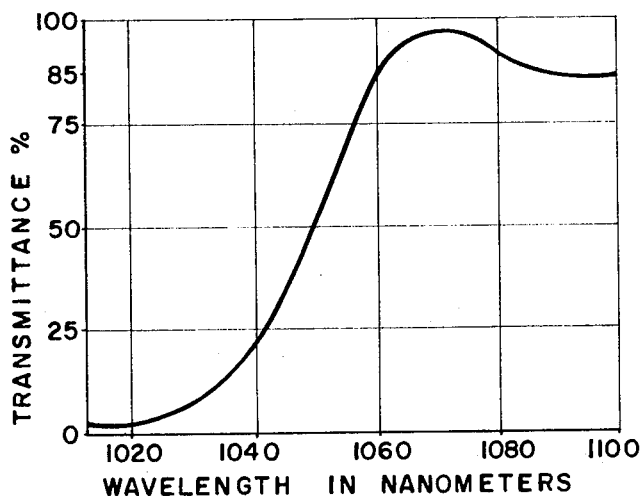
FIG. 8 is a transmittance and reflectance curve of a reflector useful in the laser device of the present invention.

The transmittance and reflectance curve of a reflector suitable for reflectors 72 and 74 in FIG. 7 is shown in FIG. 8 of the drawing. Such a reflector is available from Spectra-Physica, 1250 West Middlefield Road, Mountain View, California 94040.

Since the terminal level of the 1,024 nanometers $Yb^{3+}$ laser is approximately 522 $cm^{-1}$ above the ground level, at room temperature (approximately 300° K) approximately 6 percent of the ions are in this terminal level. It is, therefore, possible to reduce the threshold of the 1,024 nanometers laser by cooling the laser glass below room temperature. The cooling reduces the population of the terminal level thus decreasing the population that must be pumped into the initial level to reach laser threshold. The temperature range for operation of the laser is between 300° K and liquid nitrogen temperature (approximately 77° K). With efficient pump sources the laser of the present invention will have a low enough threshold to operate at room temperature (300° K) and generate 1,024 nanometers energy. However, cooling the laser below 300° K will reduce the threshold and make laser action at 1,024 nanometers possible with less efficient pump sources.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A laser device for producing laser energy in wavebands with an optical center between the range of 1,020–1,030 nanometers comprising an active laser element which fluoresces between the 1,020–1,030 nanometer range of the spectrum, means for pumping said active laser element to produce a population inversion in said element and emission of radiation therefrom in said range and optical resonant laser cavity means which is reflective for light in said range, positioned about said active laser element for stimulating and resonating said radiation, said active laser element being a ytterbium oxide doped silicate glass with a monovalent alkali metal oxide content between the range of 20–60 weight per cent of said glass and wherein the monovalent alkali metal oxide is selected from a member of the group of oxides consisting of rubidium oxide, cesium oxide, potassium oxide and mixtures thereof.

2. The laser device as set forth in claim 1 wherein the ytterbium oxide content is between the range of 0.3–8 weight per cent.

3. The laser device as set forth in claim 2 wherein said host includes neodymium oxide within the range of 0.1–3 weight per cent.

4. The device as set forth in claim 3 wherein said optically resonant laser cavity means is formed by dichroic reflectors which are more reflective for light having an optical center at 1,024 nanometers than light having an optical center at 1,060 nanometers.

5. The device as set forth in claim 4 wherein said monovalent alkali metal oxide content is cesium oxide.

6. The device as set forth in claim 4 wherein said monovalent alkali metal oxide content is rubidium oxide.

7. A laser device for producing laser energy in wavebands with an optical center between the range of 1,020–1,030 nanometers comprising an active laser element which fluoresces between the 1,020–1,030 nanometer range of the spectrum, means for pumping said active laser element to produce a population inversion in said element and emission of radiation therefrom in said range and optical resonant laser cavity means which is reflective for light in said range, positioned about said active laser element for stimulating and resonating said radiation, said active laser element consists essentially of the following constituents in the following range in per cent by weight:

| Constituent | Range in % by Weight |
| --- | --- |
| $SiO_2$ | 30–79 |
| Monovalent metal oxide selected from the group consisting of $K_2O$, $Rb_2O$ and $Cs_2O$ | 20–60 |
| Divalent metal oxide | 0–15 |
| $Al_2O_3$ | 0–5 |
| $La_2O_3$ | 0–5 |
| $B_2O_3$ | 0–2 |
| Fining agent | 0–2 |
| $Nd_2O_3$ | 0.1–3 |
| $Yb_2O_3$ | 0.3–8 |

8. The device as set forth in claim 7 wherein said optically resonant laser cavity means is formed by dichroic reflectors which are more reflective for light having an optical center at 1,024 nanometers than light having an optical center at 1,060 nanometers.

9. The device as set forth in claim 8 wherein said monovalent metal oxide is rubidium oxide.

10. The device as set forth in claim 8 wherein said monovalent metal oxide is cesium oxide.

* * * * *